United States Patent [19]

Northup

[11] 4,111,074
[45] Sep. 5, 1978

[54] HYDRAULIC CONTROL FOR HYDROMECHANICAL TRANSMISSION

[75] Inventor: Robert Powers Northup, Pittsfield, Mass.

[73] Assignee: The United States of America as represented by the Secretary of the Army, Washington, D.C.

[21] Appl. No.: 737,378

[22] Filed: Nov. 1, 1976

[51] Int. Cl.$^2$ ............................................. B60K 21/00
[52] U.S. Cl. ........................................ 74/867; 74/877
[58] Field of Search ................. 74/687, 688, 868, 877, 74/865, 861, 857, 858; 91/462, 463

[56] References Cited

U.S. PATENT DOCUMENTS

| | | | |
|---|---|---|---|
| 3,733,931 | 5/1973 | Nyman | 74/868 |
| 3,903,756 | 9/1975 | Hamma | 74/687 |

Primary Examiner—Samuel Scott
Assistant Examiner—Frank H. McKenzie, Jr.
Attorney, Agent, or Firm—Peter A. Taucher; John E. McRae; Nathan Edelberg

[57] ABSTRACT

A power transmission that includes hydraulically-operated clutches that are selectively supplied with operating fluids by a selector valve that is controlled by an error signal means constructed to compare prime mover speed and user demand speed. The transmission preferably is a split torque hydromechanical transmission having one power path going through a hydrostatic pump-motor unit and another path going only through epicycloidal gearing system containing the hydraulically-operated clutches. The transmission is controlled hydraulically rather than mechanically, thereby avoiding problems relating to mechanical slack, response lag, and reliability.

1 Claim, 4 Drawing Figures

HYDRAULIC CONTROL FOR HYDROMECHANICAL TRANSMISSION

The invention described herein may be manufactured, used, and licensed by or for the Government for governmental purposes without payment to me of any royalty thereon.

BACKGROUND AND SUMMARY OF THE INVENTION

1. Field of the Invention

The invention relates to transmissions, and more particularly, to a hydraulic controller for a split torque hydromechanical transmission.

2. Description of the Prior Art

Hydromechanical transmissions are well known in the power transmission art. These transmissions have certain desirable features when employed to drive a heavy vehicle over a wide range of speeds. In particular, a split torque hydromechanical transmission is of interest because it is possible to drive very large loads without increasing the size of the transmission components (thus keeping losses small). It is also possible to provide a wide range of speeds and greater torque without decreasing the gear ratios. In a split torque transmission, a plurality of gearing paths are provided for power transmission, which gearing paths may operate independently or in conjunction with each other. With such a split torque transmission, it is possible to provide an infinitely variable ratio of the transmission output to the transmission input. Additionally, if properly controlled, a split torque hydromechanical transmission having an infinitely variable output/input ratio may maintain a constant engine speed and power as selected by the vehicle operator.

Although split torque hydromechanical transmissions have certain well-recognized advantages, the chief problem heretofore with such transmissions has been properly controlling them to achieve maximum utilization of both the engine and the transmission. For example, since a split torque hydromechanical transmission having an infinitely variable output/input ratio has a plurality of alternate power paths, it is important to smoothly adjust the output/input ratio as road conditions may vary. A smooth adjustment of the ratio is known as a synchronous shift; that is, the overall ratio before and after the shift is the same. Prior art transmission controllers have employed mechanical linkages to effect adjustments of output/input ratio. Since any mechanical system is subject to so-called "backlash" and mechanical slack, it is difficult to continually provide a synchronous shift under all operating conditions, especially after the controller and transmission have become worn.

A further problem associated with mechanical linkages in prior art transmission controllers is that the linkages may be very complex. As a result, the linkages are expensive to manufacture, difficult to maintain, and unreliable in service. Additionally, complex mechanical linkages are heavy and require a great amount of space in which to operate. Such space and weight requirements are restrictive of the vehicle's utility.

It is a desirable feature of a transmission controller to sense overload conditions and automatically adjust transmission output/input ratios accordingly in order to maintain the operational components of the transmission within design values. Prior art mechanical controllers, after a certain period of wear has occurred, tend to react slowly and inprecisely to overload conditions. This obviously will affect the reliability of the transmission and may comprise the intended function of the vehicle in which the transmission is operating. Further, inprecise control of the transmission may lead to a mismatch between actual engine speed and a desired engine speed as well as to less than ideal engine loading.

By the present invention, the above-mentioned problems associated with mechanical linkages in controllers for split torque hydromechanical transmissions are solved. It is accordingly an object of the present invention to provide a controller for a hydromechanical transmission which smoothly adjusts the output/input ratio of the transmission as operating conditions warrant.

It is another object of the present invention to provide a controlling system for a hydromechanical transmission which is not subject to problems of backlash and mechanical slack.

It is a still further object of the present invention to provide a controller for a hydromechanical transmission which is small, light, easy to maintain, and reliable in service.

It is another object of the present invention to provide a controller for a hydromechanical transmission which reacts quickly and precisely to overload conditions in the transmission.

It is yet another object of the present invention to provide a controller for a hydromechanical transmission which eliminates mismatches between actual engine speed and a desired ending speed and which optimizes engine loading.

THE DRAWINGS

DESCRIPTION OF THE PREFERRED EMBODIMENT

Figure 1:
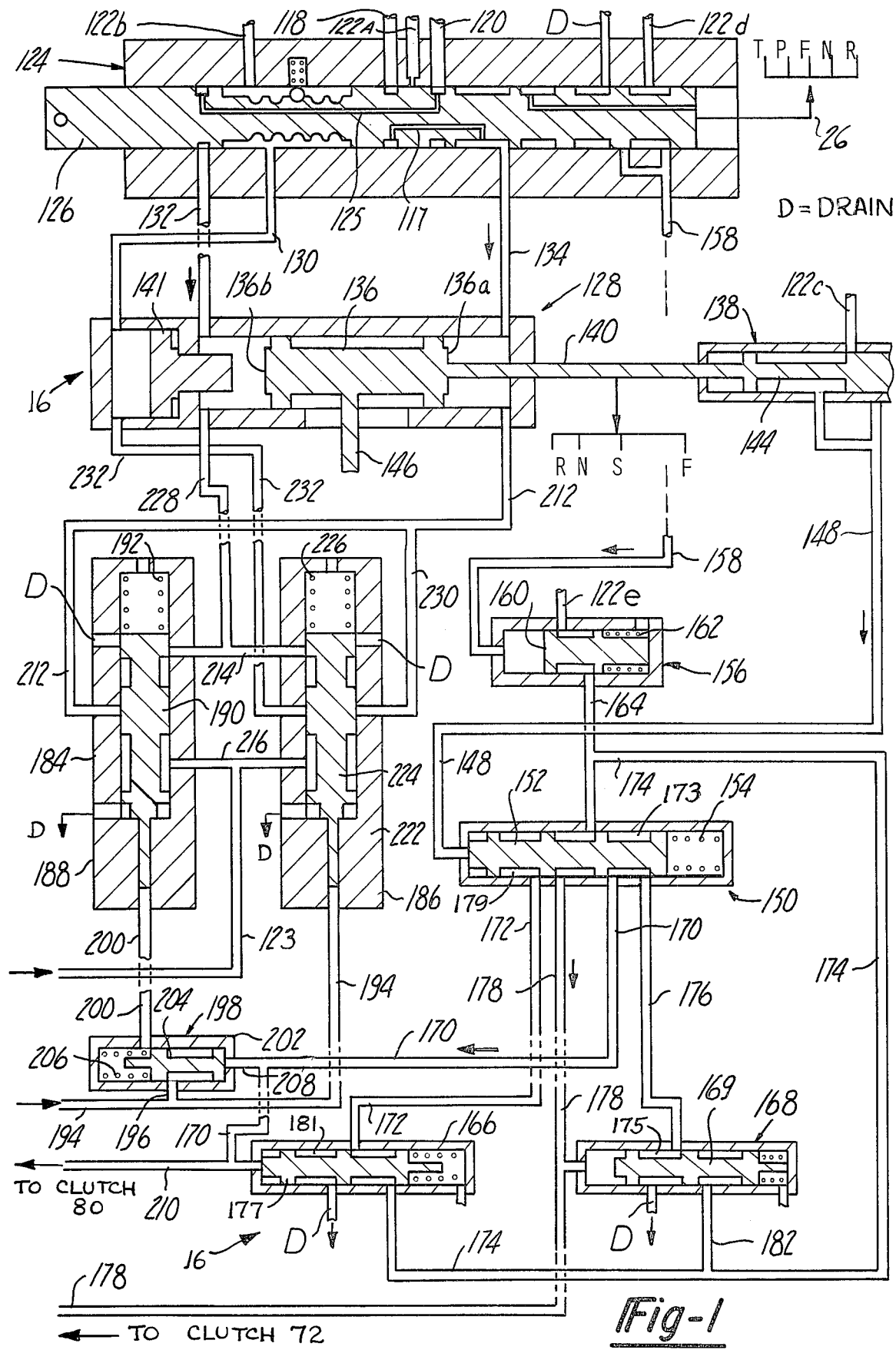
FIG. 1 is a schematic representation of a transmission control system employing the present invention.
Figure 2:
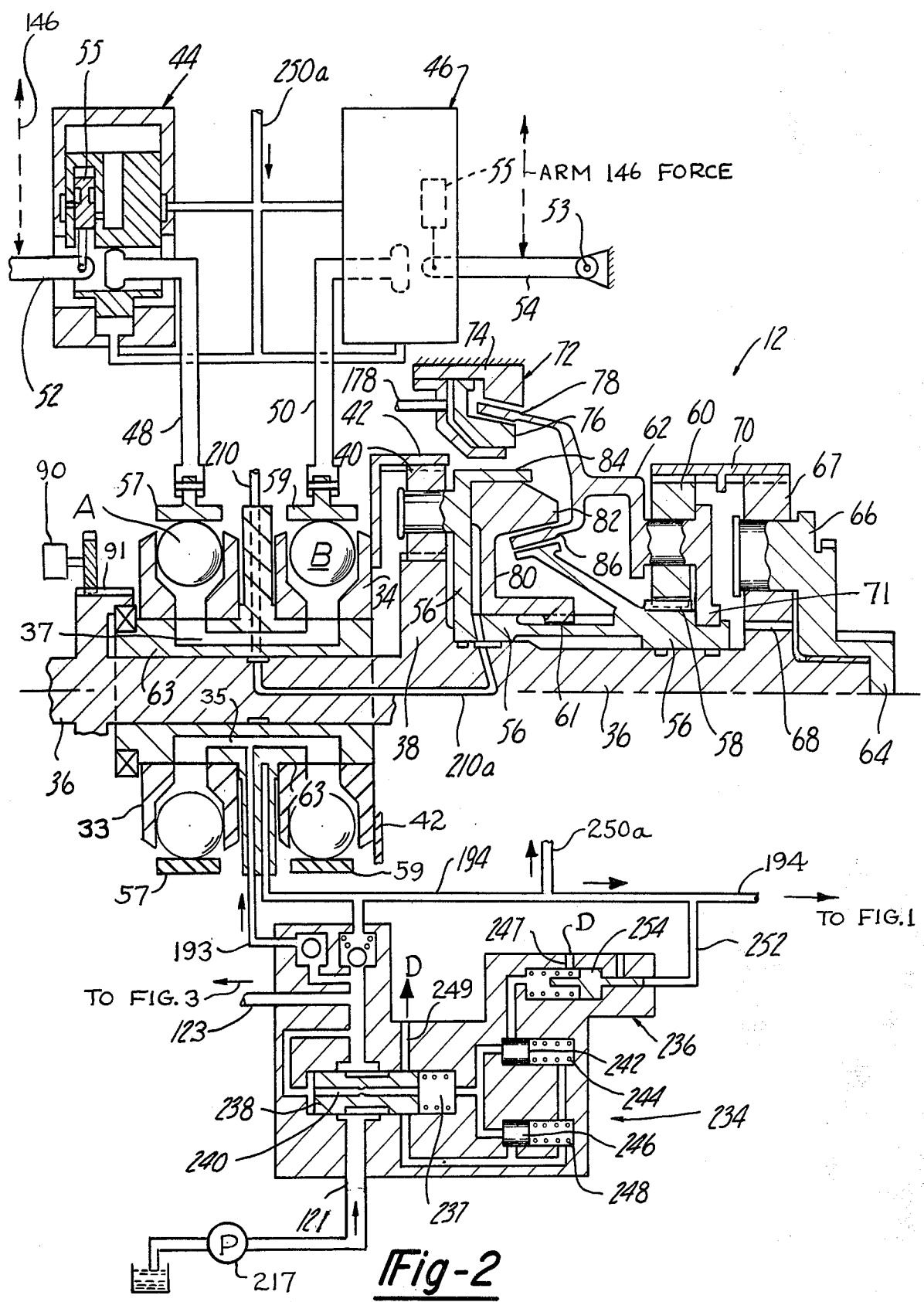
FIG. 2 is a cross sectional view of a schematic representation of the transmission employed with the present invention.
Figure 3:
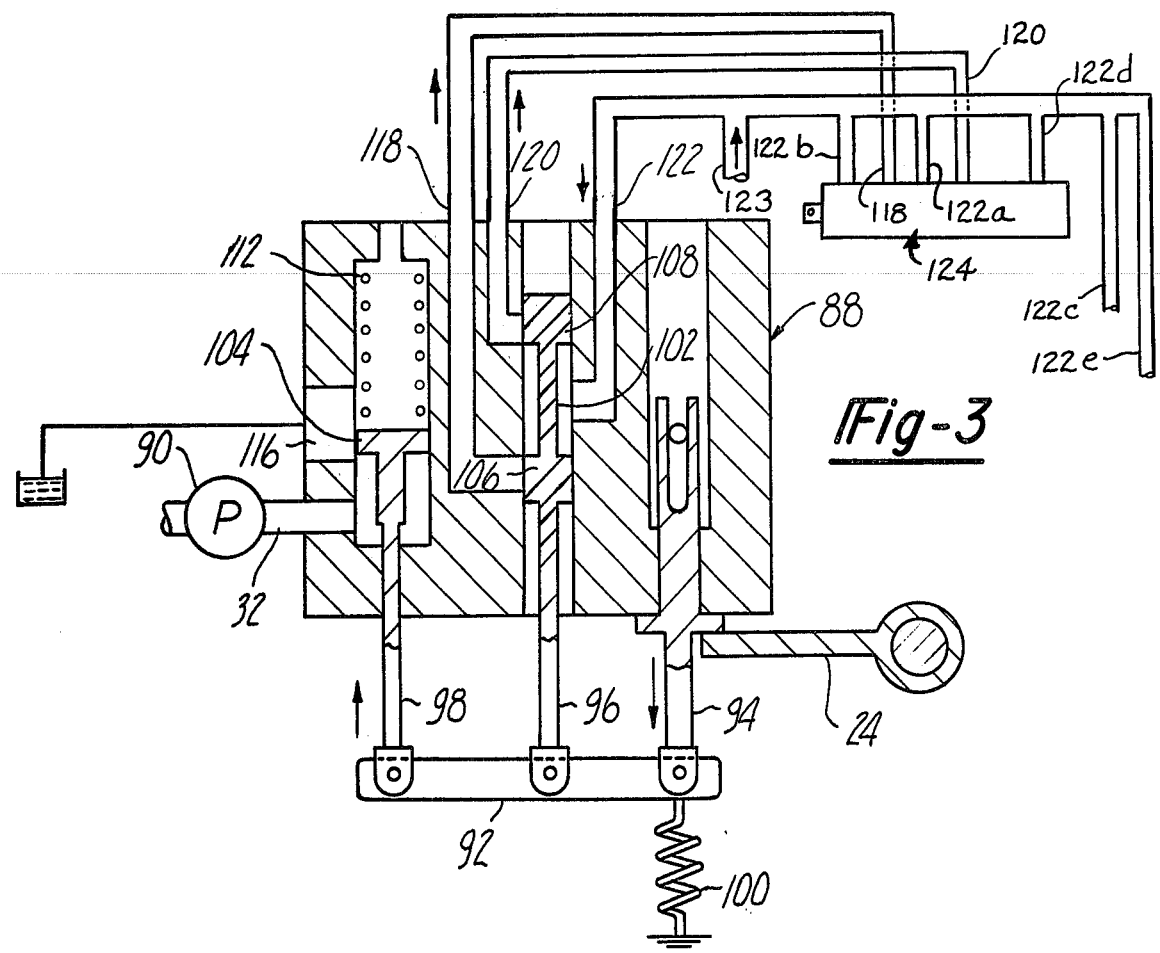
FIG. 3 is a schematic representation of a control unit employed as part of the present invention showing hydraulic lines connected thereto.

FIG. 1 illustrates a controller system for the transmission illustrated in FIG. 2. FIG. 3 illustrates a governor mechanism which develops a hydraulic error signal relating to differential speed of the engine (prime mover) and command input (accelerator pedal); the error signal is supplied to the FIG. 1 controller system, which makes the correct hydraulic inputs to the transmission to correct or eliminate the error.

Referring to FIG. 2, there is shown a transmission generally indicated by numeral 12. Transmission 12 is known as an infinitely variable ratio transmission, and, in the form illustrated, is known also as a split torque, hydromechanical transmission. Transmission 12 is intended to minimize fuel consumption and provide smooth changes in speed and torque output over a wide range of operating conditions. These changes are provided by controller 16 (FIG. 1).

A cross-sectional view of transmission 12 is shown in FIG. 2. For a more complete description of the components and operation of transmission 12, reference may be had to a prior U.S. Pat. No. 3,489,036, which illustrates a generally similar transmission structure. Only those parts of transmission 12 pertinent to the controller comprising the present invention will be described hereinafter. Transmission 12 is of the split torque type wherein there are two paths for power passing through the transmission. One power path is through hydrostatic power unit 13 comprised of hydraulic power units A and B and added gear drive components. The other power path bypasses hydrostatic power unit 13.

In order to combine the speeds and torques of the two power paths to produce a desired speed and torque output, an epicycloidal gearing system is provided. The epicycloidal gearing system comprises, in part, sun gear 38 secured to input shaft 36. Sun gear 38 drives planet gears 40 disposed within a ring gear 42 carried by the cylinder block 34 of power unit B. By rotating ring gear 42 at a speed different than that of sun gear 38, planet gears 40 may in turn be driven at a speed different that that of ring gear 42 and sun gear 38.

HYDROSTATIC DRIVE SYSTEM

In order to rotate ring gear 42, a separate drive system is provided therefor. The drive system for ring gear 42 comprises hydraulic pumping units A and B known as ball piston units; such units are more completely shown in aforementioned U.S. Pat. No. 3,489,036. In one mode of operation, unit A is driven by hydraulic fluid pumped from the prime mover; unit A in turn pumps hydraulic fluid to unit B in order to drive unit B. In this mode of operation, the A unit acts as a hydraulic pump, and the B unit acts as a hydraulic motor for driving ring gear 42. In another mode of operation, ring gear 42 may cause the B unit to act as a pump and the A unit to act as a motor for driving input shaft 36. For a more complete description of the components and operation of the A and B units, reference may be had to the previously mentioned patent.

In an illustrative mode of operation high pressure liquid is fed through line 193 to a semi-annular passage 35 within stationary pintle 63. The eccentricity of annular race 57 enables the ball pistons in rotary cylinder block annulus 33 to deliver pressure liquid to semi-annular passage 37 for action on the ball pistons in cylinder block annulus 34. Adjusted eccentricity of race 59 enables these ball pistons to produce rotary motion of cylinder block 34 and the attached ring gear 42. Liquid is discharged from the hydrostatic unit through line 194.

The speed and direction of ring gear 42 are controlled by the adjusted eccentricities of annular races 57 and 59, as more particularly explained in U.S. Pat. No. 3,489,036.

Figure 4:
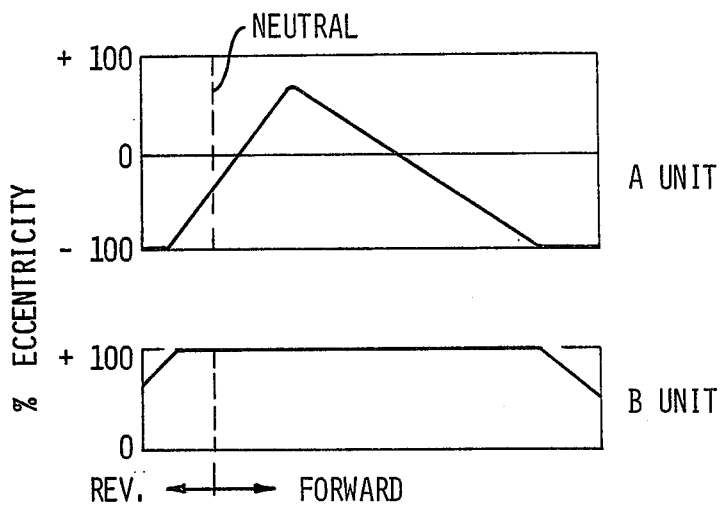
FIG. 4 is a graph showing the percent eccentricities of the races of the A and B units when the transmission operates from full reverse to full forward.

In order to control the operation of the A and B units, a pair of similar actuator control units 44 and 46 are provided. Actuator units 44 and 46 are hydraulically powered for directly operating the race-positioning push rod members 48 and 50; hydraulic pressure is supplied by high pressure supply line 250a. Actuator units 44 and 46 are themselves controlled by displacement of similar control levers 52 and 54. By moving control levers 52 and 54 about pivot support points 53 it is possible to operate pilot valve mechanisms 55 within the respective actuator units 44 and 46, thereby varying hydraulic pressure within units 44 and 46 for moving push rods 48 and 50 to change the eccentricities of annular races 57 and 59 for the A and B units. By appropriately regulating the eccentricities of the races in the A and B units it is possible to vary the speed and direction of rotation of ring gear 42. A typical eccentricity control schedule for the races of the A and B units is shown in FIG. 4.

GEAR DRIVE COMPONENTS

Additional operational components of transmission 12 will now be described. Planet gears 40 are rotatably supported by a planet gear carrier 56 which is freely rotatable about input shaft 36. Planet gear carrier 56 comprises a sun gear 58 formed at its right end. The complete structure would also include bearings appropriately situated for rotating planet gear carrier 56 about input shaft 38, and passages for directing a lubrication fluid to the bearing surfaces.

Disposed concentrically outwardly of sun gear 58 and meshing therewith are a plurality of planet gears 60 supported for rotation about sun gear 58 by a floating planet gear carrier 62. Wall portion 71 of carrier 62 seats within a groove in carrier 56 to preclude axial motion of carrier 62. Another floating planet gear carrier 66 mounts planet gears 67 for rotation about sun gear 68 carried by shaft 36. Both sets of planet gears 60 and 67 are concentrically disposed within, and mesh with, a common ring gear 70. Carrier 66 includes a central hub 64 that constitutes the output power component of the illustrated transmission.

CLUTCH SYSTEM

In order to control the operation of the epicycloidal gearing components heretofore described, a pair of clutches are provided. A first clutch 72, known as a "low clutch", comprises a fixed cylinder portion 74 and a movable piston portion 76. Movable portion 76 is hydraulically actuated by pressure fluid supplied through hydraulic line 178. Also included as part of low clutch 72 is a braking portion 78 disposed intermediate fixed portion 74 and movable portion 76 to be rendered immobile (stationary) upon actuation of movable portion 76. Braking portion 78 is rigidly affixed to planet gear 62 in order to prevent rotation thereof under certain conditions.

A second clutch 80, known as a "high clutch", is also employed to selectively control the operation of certain components of the gearing system. High clutch 80 comprises a movable piston portion 82 slidably keyed to planet gear carrier 56, as at 61. High clutch 80 also includes a cylinder portion 84 rigidly affixed to planet gear carrier 56, and a braking portion 86 interposed between movable piston portion 82 and cylinder portion 84. Braking portion 86 is connected to planet carrier 62 so that upon actuation of piston portion 82, planet gear carrier 62 and planet gear carrier 56 rotate as a unit. Actuating pressure fluid is delivered to clutch 80 through internal passage system 210a extending within rotary shaft 36 and stationary pintle structure 63 of the A and B hydrostatic units. By selectively engaging or disengaging the high and low clutches 80 and 72, either together or independently, and further by appropriately controlling the A and B units, a desired gearing combination can be achieved.

ERROR SIGNAL GENERATION

FIG. 3 illustrates an error signal mechanism 88 for comparing actual engine speed with the "command" speed called for by the accelerator pedal. The output hydraulic signal from the FIG. 3 mechanism is fed to the hydraulic control system of FIG. 1 for appropriate application to the transmission. The FIG. 3 mechanism receives input signals from the conventional accelerator pedal via mechanical lever 24. Signal unit 88 is responsive to prime mover speed through a hydraulic connection 32. Hydraulic fluid within hydraulic connection 32 varies within a range of approximately 90–110 psi supplied by metering pump 90 powered by the prime mover, as for example through a power take-off gear 91 (FIG. 2). Therefore, fluid pressure within hydraulic connection 32 is a direct function of prime mover speed.

Signal unit 88 also includes a summing bar 92, the function of which is to maintain a constant prime mover speed once a given prime mover loading has been selected by the human operator. A plurality of control rods 94, 96, and 98 are hingeably connected to summing bar 92. Control rod 94 is biased down by a spring 100 connected to a fixed anchorage; the amount of bias imparted to control rod 94 by spring 100 is controlled by the human operator via the accelerator pedal and associated mechanical linkage 24.

The displacement of the other control rods 96 and 98 is hydraulically controlled by means of pistons 102 and 104. Piston 102 includes land portions 106 and 108 joined by a reduced diameter center section. Supply pressure in lines 123 and 122 is directed into output line 118 or output line 120, depending on the position of piston 102.

Piston 104 is biased in one direction by a spring 112. Upon sufficient compression of spring 112 by the displacement of piston 104, hydraulic fluid in hydraulic connection 32 is vented to the sump through a vent or drain 116. The displacement of pistons 102 and 104, the operation of summing bar 92, and the operation of the other components of control unit 88 will be described hereinafter.

In general, the summing bar acts as a measuring element for comparing an engine-speed signal delivered through rod 98 and an accelerator-demand signal delivered through rod 94; the summing bar operates control piston 102 downwardly when the demand is not yet satisfied and upwardly when the demand is satisfied. Line 118 may be visualized as a "demand-unsatisfied" line, and line 120 may be visualized as a "demand-oversatisfied" line. With bar 92 in its illustrated "null" position the command and engine speeds are the same; the transmission ratio is maintained at a "demand-satisfied" value.

RANGE SELECTOR VALVE 124

In the upper portion of FIG. 1 there is shown a range selector valve 124 adapted to be manually operated to various adjusted positions for setting the transmission in various operating modes such as neutral, forward and reverse. Selector valve 124 is hydraulically connected to signal unit 88 via hydraulic conduits 118, 120, and 122a. Selector valve 124 includes a slidable flow diverter 126 having various fluid passages therein. By activating flow diverter 126 through a manual gear selector 26, the operator causes flow diverter 126 to be laterally displaced, in turn diverting hydraulic fluid to other components of the control system to operate the vehicle in various modes. These modes of operation are indicated in FIG. 1 as tow (T) push start (P), forward (F), neutral (N), and reverse (R). The operation of selector valve 124 will become apparent as the description proceeds.

POWER PISTON 128

In order to adjust the gear ratios in the transmission, a power piston 128 is provided. Power piston 128 is hydraulically connected to selector valve 124 through hydraulic conduits 130, 132, and 134. Power piston 128 includes a piston 136, the displacement of which controls a clutch pilot valve 138 through a push rod 140. Power piston 128 also includes a second piston 141 for limiting the displacement of piston 136. Fluid pressures in lines 132 and 134 act in opposition to one another on opposite end faces of piston 136. In general, transmission ratio decrease occurs when line 134 pressure overbalances line 132 pressure to move piston 136 to the left. The transmission ratio is increased when the line 132 pressure overcomes line 134 pressure to move piston 136 to the right.

Clutch pilot valve 138 receives hydraulic fluid supply pressure from conduit 122c. In response to an operator command, error signal unit 88 (FIG. 3) directs a signal through selector valve 124 to cause piston 136 to be laterally displaced. In turn, flow diverter 144 of clutch pilot valve 138 will also be displaced, thus changing the control pressure in line 148. Additionally, piston 136 of power piston 128 includes a link or operator arm 146. In practice link 146 is mechanically connected to control rods 52 and 54 (FIG. 2) so that movement of link 146 varies the eccentricity of the races of the A and B pump-motor units.

CLUTCH ACTUATION

Clutch pilot valve 138 controls the engagement and disengagement of the high and low clutches 72 and 80. Hydraulic fluid conducted through clutch pilot valve 138 is routed through flow cut-off element 144 and conduit 148 to a control port in a clutch selector valve 150. Clutch selector valve 150 includes a flow diverter 152 which is biased by a spring 154. Line 178 leads from valve 150 to the low clutch 72 (FIG. 2); line 170 leads from valve 150 to an interlock valve 198 and also to the high clutch supply line 210 (FIG. 2). By appropriately diverting hydraulic fluid through lines 170 or 178 the high and low clutches 72 and 80 may be operated as desired.

The hydraulic fluid necessary to operate the clutches is routed through a clutch supply valve 156 which is in hydraulic communication with shift selector valve 124 through a hydraulic conduit 158. Clutch supply valve 156 includes a flow cut-off element 160 which is biased by a spring 162 against hydraulic pressure supplied though conduit 158. If the fluid pressure in conduit 158 is increased, flow diverter 160 is displaced to the right, permitting hydraulic fluid to flow from supply conduit 122e through clutch supply valve 156 and thereafter through conduit 164 to clutch selector valve 150. Depending upon the position of flow diverter 152, hydraulic fluid is appropriately directed to the clutches.

The apparatus for finally effecting disengagement of the clutches is low clutch vent valve 166 and high clutch vent valve 168. Low clutch vent valve 166 is controlled by pressure developed within hydraulic conduit 170 leading from valve 150. High clutch vent valve 168 is controlled by pressure developed within conduit 178 when low clutch 72 is engaged. In the illustrated condition clutch 80 is vented through a path comprising lines 210 and 170, groove 173, line 176, and groove 175. Displacement of valve elements 169 and 177 to their alternate non-illustrated positions permits clutch 72 to be vented through a path comprising line 178, groove 179, line 172, and groove 181.

In the position illustrated, diverter 152 of clutch selector valve 150 directs hydraulic fluid through line 178 to low clutch 72 to operate the same. The operation of the above-mentioned valves with respect to engagement and disengagement of the high and low clutches will be described hereinafter.

OVERLOAD SYSTEM

A pressure relief system is provided as part of the illustrated circuit. The overload system comprises, in part, high clutch relief valve 184 and low clutch relief valve 186. High clutch relief valve 184 is arranged to operate only when high clutch 80 is operating; low clutch relief valve 186 is arranged to operate only when low clutch 72 is operating. Both relief valves function to relieve hydraulic pressures above design valves by sensing transmission pintle pressure, and thereafter diverting flow to power piston 128 to reduce transmission gear ratios and hydraulic pressures to acceptable levels.

High clutch relief valve 184 is comprised of a housing 188 having a flow diverter 190 slidably disposed therein, which flow diverter is biased by a spring 192. The pintle pressure developed within the hydrostatic units A and B of the transmission is transmitted through conduit 194 to the relief valve system. In order to sense transmission pintle pressure in hydraulic conduit 194, high clutch relief valve 184 communicates with conduit 194 through a conduit 200, high clutch interlock valve 198, and branch conduit 196. High clutch interlock valve 198 comprises a housing 202 having a flow cut-off element 204 slidably disposed therein. Upon engagement of high clutch 80, hydraulic fluid is directed through a conduit 208 tapped from conduit 170 and directed to the actuator face of high clutch interlock valve 198. Fluid pressure is also directed through conduit 210 directly to high clutch 80 to operate same (see FIG. 2). At the same time, flow diverter 204 is biased against spring 206 in order to permit hydraulic fluid to flow from conduit 194 through conduit 196 and conduit 200 to the piston actuator in high clutch relief valve 184. Accordingly, flow diverter 190 in high clutch valve 184 will be appropriately displaced as a function of pintle pressure in conduit 194.

High clutch relief valve 184 is hydraulically connected to face 136a of piston 136 by means of hydraulic conduit 212. High clutch relief valve 184 is also connected to low clutch relief valve 186 through conduits 214 and 216. Hydraulic conduit 216 is provided with a source of so-called "makeup pressure" through conduit 122 which leads from an engine-driven pump 217 (FIG. 2).

Low clutch relief valve 186 is identical in design and function to high-clutch relief valve 184, except that low-clutch relief valve 186 is designed to divert flow through power piston 128 at different pressure levels. Low clutch relief valve 186 comprises a housing 222 having a flow diverter 224 slidably disposed therein, which flow diverter is biased by a spring 226. The piston actuator portion of low clutch relief valve 186 is in direct communication with a source of transmission pintle pressure through conduit 194.

In order to adjust transmission gear ratios as required, low clutch relief valve 186 is connected to piston 136 by hydraulic conduits 228 and 230 which are arranged to direct flow to faces 136b and 136a, respectively of piston 136. Low clutch relief valve 186 is connected to piston 141 through a conduit 232.

In the illustrated positions of diverter elements 190 and 224 conduit 216 is hydraulically isolated from power piston 128. An excessive pressure in conduit 200 causes diverter 190 to move upwardly, thereby connecting conduit 214 to drain D. A similar pressure-relief movement of diverter 224 occurs when an excessive pressure develops in conduit 194 during operation of clutch 72.

PRESSURE REGULATION

As shown in FIG. 2, the illustrated system includes a pressure regulator 234 and a signal valve 236. Pressure regulator 234 provides a variable makeup pressure to operate the high and low clutches, depending upon demands placed on the transmission. When demands on the transmission are low as sensed by a low pintle pressure in conduit 194 the makeup pressure (in line 123) employed to operate clutches 72 and 80 is also kept low. On the other hand, when transmission demands are high as indicated by a high pintle pressure in conduit 194, a higher makeup pressure is employed to insure that the clutches are firmly engaged. This is accomplished by providing pressure regulator 234 with dual sliding pistons 242 and 246 operable at different pressure levels. A source of makeup pressure is directed from conduit 121 through a sliding valve 238 having a venturi section 240 therein. Venturi section 240 causes a pressure drop in the makeup system in order for the pressure regulator to operate at lower pressure levels. Pressure regulator 234 includes a first slidable valve 242 biased by a spring 244 to open valve 242 at approximately 150 psi. Pressure regulator 234 is also provided with a second slidable valve 246 biased by a spring 248 to open valve 246 at approximately 250 psi. Under low load conditions, valve 242 opens at 150 psi, thereby lowering the pressure in chamber 237 and enabling valve element 238 to move to the right, thus causing the groove in element 238 to vent hydraulic fluid from line 121 to the sump through port 249. However, under high load conditions, the increased pressure in conduit 194 and branch 252 causes signal valve 236 to close at approximately 2200 psi. Slidable valve element 254 disposed within signal valve 236 is axially displaced, thus shutting off the vent flow through port 247. Thereafter, the pressure in pressure regulator chamber 237 rises to move element 238 to its non-vent position.

GENERAL MODE OF OPERATION

The advantages to be derived from use of the present invention can be understood best by examining the various modes of operation.

NEUTRAL

When the operator moves gear selector 26 (FIG. 1) to the neutral position, it is required that output shaft 64 (FIG. 2) be stopped while input shaft 36 continues to rotate. Therefore, planet gears 67 must rotate in place in order to prevent rotation of planet gear carrier 66. In turn, the pitch line speeds of ring gear 68 and common ring gear 70 must be equal and opposite. The necessary speed of common ring gear 70 is achieved in the following manner. Assuming a clockwise rotation of input shaft 36, common ring gear 70 must rotate in a counter-clockwise direction. Therefore, sun gear 58 must rotate in a clockwise direction and planet gear carrier 62 must be fixed. Planet gear carrier 62 is fixed by engaging low clutch 72. Sun gear 58 is rotated in a clockwise direction by rotating planet gear carrier 56 in a clockwise direction; this is effected by rotating ring gear 42 in a clockwise direction. The proper eccentricities of the A and B units required to rotate ring gear 42 in a clockwise direction and thus achieve a neutral condition are indicated in FIG. 4.

In order to operate the transmission in a neutral condition, it is necessary that the controller must perform two functions: engage the low clutch 72 and properly control the eccentricities of the races of the A and B units. The low clutch is engaged as follows. When the operator moves gear selector 26 to neutral, flow diverter 126 in selector valve 124 is axially displaced. In turn, hydraulic fluid at makeup pressure (150–250 psi) in conduit 122a is directed through passage 117 and conduit 134 to face 136a of piston 136. At the same time, hydraulic fluid in conduit 120 is isolated from conduit 132; accordingly the pressure on face 136b of piston 136 is reduced. Therefore, piston 136 is axially displaced to the left until it encounters piston 141. Since the makeup pressure from conduit 122b through conduit 130 is not yet disturbed, piston 141 remains under pressure and constrains the displacement of piston 136 upon engagement thereof.

Due to the displacement of piston 136, flow element 144 in clutch pilot valve 138 prohibits the conveyance of hydraulic fluid from conduit 122c to conduit 148. Therefore, flow diverter 152 in clutch selector valve 150 is biased by spring 154 to the position indicated in FIG. 1. Further, flow diverter 160 of clutch supply valve 156 is in the position indicated to permit hydraulic fluid to flow from conduit 122e through conduit 164 and into clutch selector valve 150. This fluid is conveyed through conduit 178 directly to low clutch 72 (FIG. 2) to cause engagement thereof.

The leftward displacement of piston 136 (in unit 128) also causes arm 146 to move leftwardly for actuating control levers 52 and 54 (FIG. 2). The mechanical interconnection between arm 146 and control levers 52 and 54 is not shown. Any type of interconnection, such as cams, may be employed to displace control levers 52 and 54 upon displacement of arm 146. In the embodiment illustrated, the interconnection between arm 146 and control levers 52 and 54 results in the eccentricity schedule illustrated in FIG. 4.

When the transmission is operating in neutral, hydraulic pressures within the transmission are low and the overload system (mechanisms 184 and 186) is not employed. This is because pressure in conduit 194 is low and piston 224 in low clutch relief valve 186 is in the position shown in FIG. 1. Therefore, hydraulic fluid conducted through power piston 128 via conduits 232 and 212 is not capable of flowing through low clutch relief valve 186. Since the pressure in line 194 is low, signal valve 236 (FIG. 2) will not be closed by the pressure in conduit 252. Therefore, valve 242 of pressure regulator 234 will open at 150 psi and vent through port 247. To insure that only the low clutch 72 is engaged during neutral operation, conduits 170, 176, 208 and 210, which communicate with high clutch 80, are vented to the sump through drain port D of high clutch vent valve 168.

FORWARD

It will be assumed that the operator has moved gear selector 26 to the forward position F and is depressing the accelerator pedal to accelerate to top forward speed. Thereafter, the transmission will be operated automatically as described hereinafter. In the forward mode of operation, it is desired that output shaft 64 (FIG. 2) rotate in the same direction as input shaft 36, namely clockwise. Therefore, the counterclockwise rotation of common ring gear 70 in the neutral position gradually must be reduced to zero and then increased in the clockwise direction. In this sense, the transmission illustrated with the present invention is a two-speed transmission: a first period of acceleration occurs during the period when the counterclockwise rotation of common ring gear 70 is reduced to zero, and a second period of acceleration occurs when common ring gear 70 is given increasing clockwise rotation.

In order to produce the first period of acceleration, the rotation of planet gears 60 must be gradually stopped. This is accomplished by reducing the clockwise rotation of ring gear 42 through adjustment of the eccentricities of the races of the A and B units. This is done by arm 146 and associated mechanisms 44 and 46 according to the schedule shown in FIG. 4. The change in eccentricity is gradual so that eventually the clockwise rotation of ring gear 42 will be stopped. Since sun gear 38 continues to rotate clockwise with input shaft 36, planet gear carrier 56 will also be rotated clockwise by planet gears 40. However, the clockwise rotation of planet gear carrier 56 will be less than that in the neutral position since the clockwise rotation of ring gear 42 has been stopped. It will be remembered the low clutch 72 is still engaged and thus planet gear carrier 62 is fixed. Thus, common ring gear 70 is still rotating in a counterclockwise direction although slower than previously. Therefore, planet gears 67 are being driven by sun gear 68 in a counterclockwise sufficient to cause planet gear carrier 66, and thus output shaft 64, to rotate in a clockwise direction.

As the counterclockwise rotation of ring gear 42 increases due to the changes in eccentricities of the races of the A and B units, eventually planet gears 40 will rotate in place, and the rotation of planet gear carrier 56 and sun gear 58 associated therewith will be stopped. At this point, since planet gear carrier 62 is also stopped, the rotation of common ring gear 70 is halted and all power being delivered to output shaft 64 is through gear 68, planet gears 67 and planet gear carrier 66.

The second period of acceleration is commenced by releasing low clutch 72 and engaging high clutch 80 so that planet gear carrier 56, sun gear 58, plane gear 60, and planet gear carrier 62 rotate together about input shaft 36. Subsequently, the eccentricities of the A and B units are reversed so that ring gear 42 now begins to rotate again in a clockwise direction. Therefore, plane gear carrier 56 is caused to rotate in a clockwise direction and as a result, common ring gear 70 also rotates in a clockwise direction. This adds to the clockwise rotation of planet gear carrier 66 to produce a greater clockwise rotational speed of output shaft 64.

It is seen that in order to transition from neutral to full forward, it is necessary to adjust the eccentricities of the A and B units to control the speed and direction of rotation of ring gear 42. Further, it is necessary to disengage low clutch 72 and engage high clutch 80 in conjunction with the change in eccentricities of the A and B units. Referring to FIG. 3, as the accelerator pedal is fully depressed, control rod 94 is moved in a downward direction. As prime mover speed increases due to the increased throttle opening, the hydraulic pressure in conduit 32 also increases. This tends to move piston 104 against spring 112 and thus raise control rod 98. However, as piston 104 is displaced, more and more hydraulic fluid vents to the sump through opening 116; therefore piston 104 and control rod 98 tend to quickly come to an equilibrium position.

As soon as the accelerator pedal is fully depressed, and before the prime mover has had time to increase in speed, rod 96 and piston 102 will be displaced downwardly. The fluid makeup pressure in conduit 122 will be conveyed past piston 102 into conduit 118. In turn, since selector valve 124 (upper portion of FIG. 1) is in that position shown in FIG. 1, the hydraulic fluid will be conducted from conduit 118 through passage 117 in selector valve 124 and into conduit 134. The fluid pressure will act against face 136a of piston 136, thereby tending to decrease the gear ratio during the period of initial acceleration before the prime mover has reached top speed. As mentioned previously, this is effected by adjusting the eccentricities of the A and B units through the interconnection between arm 146 and control levers 52 and 54.

As the prime mover speed increases (with the accelerator pedal fully depressed) control rod 98 (FIG. 3) will gradually be raised. This will cause rod 96 and piston 102 to be raised, to thus gradually stop the flow of hydraulic fluid into conduit 118 and commence a flow of hydraulic fluid from conduit 122 into conduit 120. Conduit 120 delivers pressure fluid through internal passage 125 in element 126; passage 125 in turn delivers the fluid to conduit 132 which applies increased hydraulic pressure on face 136b of piston 136. The stoppage of flow through conduit 118 lessens the pressure in conduit 134. Therefore the hydraulic pressure on face 136b of piston 136 is increased while the pressure on face 136a is gradually decreased. This will rightwardly displace push rod 140 and flow element 144 in clutch pilot valve 138. This is shown by the imaginary ratio indicator in FIG. 1 as progressing from neutral (N) through slow (S) to fast (F). While push rod 140 is being displaced between N and S, the transmission is in its first period of acceleration as described previously.

When the imaginary indicator on push rod 140 is opposite the S position, the low clutch 72 is disengaged and the high clutch 80 is engaged to initiate the second period of acceleration. As push rod 140 is further displaced toward the F position, the speed of output shaft 64 is gradually increased due to further changes in the eccentricities of the A and B units.

In order to make a synchronous shift as the vehicle accelerates, it is necessary that the low clutch not be released until the hydraulic pressures in the high clutch approach design values. Similarly, when the vehicle is decelerating, it is necessary that the high clutch not be released until the hydraulic pressures in the low clutch approach design values. This can be understood by examining how a synchronous shift is made. When push rod 140 is at the position indicated by S, flow cut-off element 144 will be displaced axially to permit fluid at makeup pressure to flow from conduit 122c thrugh conduit 148 to the end face of piston 152 in clutch selector valve 150. This will cause piston 152 to be displaced against spring 154; however, low clutch 72 will continue to be engaged since fluid at makeup pressure will continue to flow from conduit 164 to conduit 178. As piston 152 is further displaced to the right, the fluid at makeup pressure in conduit 164 is gradually shifted into conduit 170; the flow of hydraulic fluid into conduit 178 is decreased. Thus, hydraulic fluid is directed to high clutch interlock valve 198 through conduit 208, and to high clutch 80 via conduit 210.

In order to prevent low clutch 72 from being disengaged immediately upon the engagement of high clutch 80, a portion of the fluid at makeup pressure in conduit 174 is conducted through low clutch vent valve 166 and thereafter to clutch selector valve 150 through conduit 172. Even though piston 152 will have been displaced enough to shut off any fluid flow through conduit 178 from conduit 164, the return circuit provided through low clutch vent valve 166 and conduit 172 maintains the hydraulic pressure in conduit 178. However, after the pressure in conduit 170 approaches design values, the piston in low clutch vent valve 166 is axially displaced and prevents further flow thrugh conduit 172 from conduit 174. In turn, the flow of fluid from conduit 178 is stopped, thereby reducing the pressure on the left face of piston 169 in valve 168. The piston in high clutch vet valve 168 is thereby axially displaced by the associated spring. This diverts fluid in conduit 174 to conduit 176 and thus disengages low clutch 72.

If the operator desires to slow the vehicle after entering the second period of acceleration, the re-engagement of low clutch 72 and disengagement of high clutch 80 is substantially the reverse of the above-described procedure. In this case, hydraulic pressure in conduit 148 is decreased due to the displacement of push rod 140 and flow diverter 144 in clutch pilot valve 138. The flow of hydraulic fluid in conduit 178 is re-established, and conduit 176 is vented to the sump through the drain port D in valve 168. In turn, the pressure on the left end face of the piston in low clutch vent valve 166 is decreased, permiting a re-establishment of the flow in conduit 174 to conduit 172 through the right relief area in low clutch vent valve 166. At this point, the low clutch is fully engaged and the high clutch is disengaged.

Relative to operation of the relief system, piston 204 in high clutch interlock valve 198 is axially displaced upon an increase in pressure in conduit 208 (clutch 80 engaged). This permits pintle pressure to be sensed in high clutch relief valve 184 by establishing a flow of hydraulic fluid through conduits 196 and 200. If the pressure in conduit 194 should suddenly be increased due to a change in load conditions, piston 190 in high clutch relief valve 184 would be displaced. Thereafter, the fluid at makeup pressure in conduit 216 would be diverted through conduit 212 to increase the pressure against face 136a of piston 136. To permit piston 136 to be displaced to the left, and thus lower the gear ratio to prevent an overload condition, hydraulic fluid in conduit 214 is vented to the sump through port D in valve 184, thus relieving pressure against face 136b of piston 136. Thus, both the eccentricities of the A and B units and the transmission gear ratios would change to prevent an overload condition.

In a similar manner, if the low clutch were engaged, an increase in pintle pressure in conduit 194 would displace piston 224 in low clutch relief valve 186. As with high clutch relief valve 184, fluid at makeup pressure in conduit 216 would be directed through conduit 230 to face 136a of piston 136. At the same time, hydrauic fluid in conduit 228 would be vented to the sump 114 through conduit 214 and drain port D in valve 186. However, if the overload condition occurs while the low clutch is engaged, an additional gearing reduction might be necessary. Therefore, hydraulic fluid in conduit 232 is also directed through conduit 230 and against face 136a of piston 136. Since conduit 228 is now vented to the sump through port D in valve 186, piston 141 will be balanced by equal pressures on both sides, and thus piston 136 can be displaced as necessary to provide a proper gear radio.

During the first period of acceleration, through the transition period when the low clutch is disengaged and the high clutch is engaged, and thereafter during the second period of acceleration, the overload system will operate as previously described. That is, fluid at makeup pressure throughout the system will remain between 150 psi and 250 psi due to the action of valve 242 in pressure regulator 234. However, when pintle pressures in conduit 252 reach 2200 psi valve 254 will close port 247, thus permitting makeup pressure in conduit 122 to increase to 250 psi as determined by valve 246 in pressure regulator 234. Although pintle pressures of 2600 psi and 3600 psi are necessary to sufficiently displace the high clutch relief valve and low clutch relief valve, respectively, and thus lower the gear ratios, the makeup pressure in the system can at no time exceed 250 psi.

The drawings disclose specific devices and arrangements embodying the invention system or concepts. However it will be appreciated that the invention may be embodied in other structural arrangements.

I claim:

1. A hydromechanical transmission connectable between a prime mover and power-using device: said transmission comprising an input shaft (36); an output shaft (64); a hydrostatic pump-motor unit connected to the input shaft; control means (44, 46) associated with said pump-motor unit for varying the pump displacement and motor displacement; an epicycloidal gearing system connected to said shafts and to the pump-motor unit, said gearing system including two planet gear carriers (62 and 56);

a first hydraulically-operated clutch (72) for exerting a locking action on one of the planet carriers to establish a low output speed ratio drive path through the gearing system; a second hydraulically-operated clutch (80) for exerting a locking action on the other planet carrier to establish a high output speed ratio drive path through the gearing system;

an error signal means (88) for comparing prime mover speed and user demand speed; said signal means including a hydraulic input (32, 98) representing prime mover speed, a mechanical input (24, 94) representing user demand speed, and two separate hydraulic output signals (118 and 120) representing plus or minus differentials between user demand speed and prime mover speed;

a clutch selector valve (150) having an inlet (164) connected to a hydraulic pressure source, a first pressure outlet (178) connected to said first clutch for operating same, a second pressure outlet (170) connected to said second clutch for operating same, a third drain outlet (172) for the first clutch, a fourth drain outlet (176) for the second clutch, and a flow diverter piston (152) movable in a reciprocatory fashion between (1) a first position wherein the inlet is connected to the first pressure outlet and the secnd pressure outlet is connected to the fourth drain outlet, and (2) a second position wherein the inlet is connected to the second pressure outlet and the first pressure outlet is connected to the third drain outlet;

means for operating the flow diverter piston comprising a spring means (154) and hydraulic means (148) controlled by a pilot valve (138) having a power piston (136); said power piston having opposed end faces (136a and 136b) located to receive the aforementioned hydraulic signals (118 and 120), whereby said pilot valve is closed when user demand speed exceeds prime mover speed and open when prime mover speed exceeds user demand speed;

means (166) for depressurizing the first clutch, comprising a piston (177) that is operated by a pressurized condition of the aforementioned second outlet to form a drain path from the third drain outlet;

means (168) for depressurizing the second clutch, comprising a piston (169) that is operated by a pressurized condition of the aforementioned first outlet to form a drain path from the fourth drain outlet;

and means (146) responsive to motion of the aforementioned power piston (136) for operating the aforementioned pump-motor control means (44, 46).

* * * * *